Oct. 27, 1959     R. H. MYERS     2,909,925

MAXIMUM TEMPERATURE RECORDING DEVICE

Filed Dec. 21, 1956

INVENTOR.
*Richard H. Myers*
BY
*W. R. Robertson*
AGENT

United States Patent Office 2,909,925
Patented Oct. 27, 1959

2,909,925

MAXIMUM TEMPERATURE RECORDING DEVICE

Richard H. Myers, Arlington, Tex., assignor to Chance Vought Aircraft, Incorporated, Dallas, Tex., a corporation of Delaware Application December 21, 1956, Serial No. 629,962

2 Claims. (Cl. 73—358)

This invention relates to temperature-indicating devices and more particularly to a substantially unbreakable device suitable for recording the maximum temperature reached within a given time period in a given location subjected to fluctuations in temperature.

Presently existing temperature-recording devices utilize the principle of temperature indication by color change of dyes or chemicals housed within glass and/or other such parts subject to breakage when subjected to blows, vibrations, or excessive temperatures. Another type of temperature recorder, the recording thermometer, involves the translocation of a liquid within a container, and still another utilizes the mergence of two liquids to indicate a certain temperature level. Still other recorders produce graphic records which are analogs of experienced temperatures, and are actuated by expansion of a temperature-sensitive element, electrical energy generated by heat at a thermocouple, etc. Graphic recorders have tended to be expensive, and because of their size and delicacy frequently must be mounted at some distance from the site at which maximum temperature is to be measured. Other recorders, such as visual indicators including recording thermometers, are inclined to be smaller and thus may more readily be located in the area where maximum temperature is to be measured and recorded. Such instruments tend to be readily broken, however, and consequently require shock mounting where the location is subject to more than a minimal degree of shock and vibration. Even with such mounting, these instruments are breakable when subjected to direct blows; and their cost, though not always excessive, still is considerable. In some locations, for instance in an aircraft hydraulic system, the fragments resulting from their breakage can constitute a hazard of sometimes very serious proportions. Where the location in which the recording device must be installed is excessively short, or where it is attenuated but more or less sharply bent, installation of the device is frequently a physical impossibility unless the device is specially made for the specific application. This expedient is not always possible, and at best is expensive.

A major object of this invention is to provide a maximum temperature recording device which is virtually immune to inadvertent breakage even under conditions of relatively severe impact, shock, and vibration.

Another object is to provide a maximum temperature recording device which is so easily and inexpensively made as to be readily expendible following use thereof.

A further object is to provide a device of the character stated above which may be quickly and inexpensively installed without the use of shock mounts.

Yet another object is to provide a device such as thus far stated which produces an indelible and unequivocal record of maximum temperature, such record being readily accessible.

A still further object is to provide a device meeting the above objects which is invulnerable to the effects of excessively high and low temperatures and fluid pressures.

Still another object is to provide a maximum temperature indicator which is bendable by hand or by simple tools to a multitude of shapes for permitting placement of the same in cramped or tortuous quarters.

Other objects and advantages will be apparent from the specification and claims and from the accompanying drawings which illustrate an embodiment of the invention.

In accordance with the invention, the aforementioned and other objects are attained by providing a maximum temperature recording device in which each of one or more isolated areas of a metallic or plastic material substantially immune to inadvertent breakage and of tubular form contains a substance or material of a known melting point. This fusible material may be of any definite form (solid, granular, powder, etc.) which will be plainly and irreversibly changed when its temperature is raised above and subsequently lowered below its melting point, thus effecting fusion and subsequent solidification of the material. To provide a desired range over which maximum temperature may be recorded, as many as necessary of such materials may be used, each in an individual, isolated area, and each having a different melting point. As the melting point of each of the isolated temperature-recording materials is reached, the particular material melts and subsequently solidifies within its restricted area. This process affects all materials contained inside the device within the limits of and including the maximum temperature reached in the particular location where the device is used. Therefore, by placing materials of progressively different melting points in sequence within the isolated areas, a permanent history is available of the temperature range to which the device has been exposed. Means are provided whereby the device may be broken open at each isolated area, and the material found therein will reflect whether the temperature corresponding to the melting point of that material was exceeded. Markings are provided on the device for identifying the melting point of each fusible material contained therein.

The nature and construction of the invention may best be described in connection with the accompanying drawings in which like numerals are used throughout to designate like parts in the several views.

Figure 1:
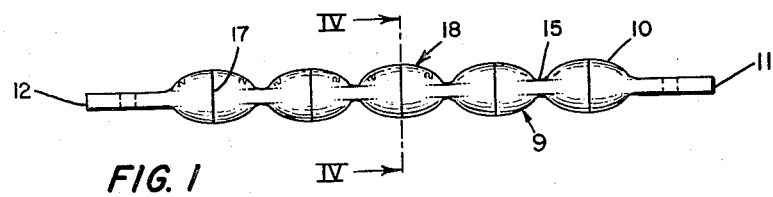
Fig. 1 is a front elevational view showing a maximum temperature recorder constructed according to the invention.

Referring to Fig. 1, a preferred embodiment of the present invention is shown at 9 and comprises an elongated tubular member or casing 10 which conveniently is made of metal and is sealed by any adequate permanent means at its ends, the sealing being accomplished in the specific example by flattening the wall of the member 10 at its ends as shown at 11 and 12. If desired, the flattened portions 11 and 12 may have openings, as indicated at 13 and 14 respectively, for attachment of wires or other supporting means for securing the member 10 within a location whose maximum temperature is to be recorded. It should be understood that the flattened portions 11, 12 are not always necessary to the effectiveness of the device, as evidenced in the case of an annular indicator which would have no extremities.

Figure 2:
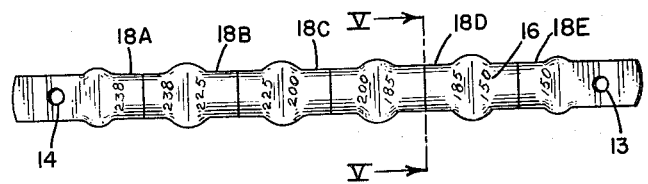
Fig. 2 is a plan view of the recorder.
Figure 3:
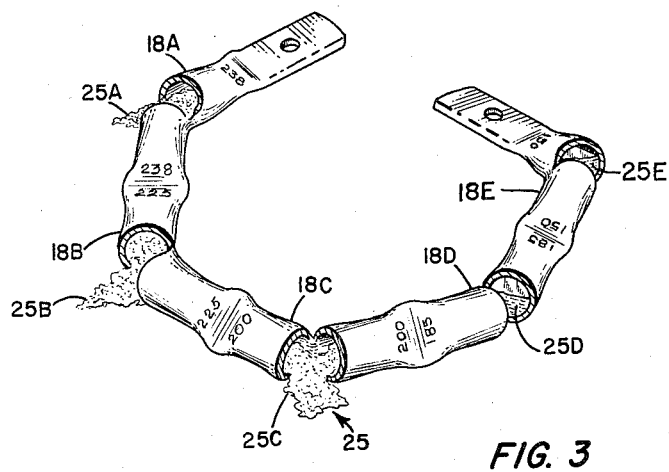
Fig. 3 is an enlarged perspective view of the device revealing the various isolated chambers in their "opened" condition.

The tubular member 10 is filled with fusible materials as exemplified by 25 in Fig. 3, preferably starting with the substance having the highest or lowest melting point and continuing with the remaining materials progressively according to their respective melting points. The first material is introduced into the tubular member 10 (Fig. 1) through an open end thereof, said member 10 having been sealed as described above at one end, for example at 12, and the material is caused to lie adjacent this end. Next, a vice or any suitable clamping device is used to pinch or constrict the tube 10 as revealed at 15 in the area immediately beyond the material on its side opposite the closed end 12. An isolated chamber 18 thus is formed about the introduced material. Each material is similarly inserted into the member 10 and subsequently sealed off from the adjacent, last-formed chamber in the manner just described. The individual chambers 18 of the example may be exteriorly labeled with numerals, as indicated at 16 (Fig. 2) which may correspond to the melting point of the particular material contained therein, the numerals being applied thereon with a stylus or any suitable etching or marking device. To facilitate entry into the separate chambers 18 following a recording period, each chamber may have a peripheral notch or groove such as 17 cut into its outer surface with a file or other suitable cutting instrument, which notching may conveniently be executed at the time the chambers 18 are formed. The notches 17 may be cut so that they partially or completely encircle the outer periphery of the tubular member 10. The depth of each weakening notch 17 should be such as to make easily possible the deliberate rupture of the wall of the tubular member 10 for inspecting the contents of a chamber 18, but should not be so deep as to render the device 9 fragile and susceptible to inadvertent breakage.

Referring to Fig. 3, the device 9 is shown after use in a location subjected to variations in temperature. In operation, the maximum temperature recorder 9 is placed or attached within a location, for instance, within the reservoir of an aircraft hydraulic system, with the purpose of recording the highest temperature experienced in that location during a given time-period, for instance, the highest temperature of hydraulic fluid in the reservoir during a given flight. The range of melting points collectively exhibited by the substances 25 should in any case bracket the range in which the maximum temperature may be expected to fall.

At the end of a desired period (for example, at the end of a flight) the device 9 is removed from the location in which it has been used, and each chamber 18 is broken open by laterally bending the tube 10 at each groove 17, thus snapping open each chamber. In the specific example illustrated in Fig. 3, the contents 25D and 25E of chambers 18D and 18E respectively have melted and solidified, both said materials 25D and 25E having melting points lower or equal to the maximum temperature to which the device 9 has been exposed. In accordance with the behavior of the chemicals used, the materials 25A, 25B, 25C, contained within chambers 18A, 18B, 18C respectively, are shown released therefrom in their original, fragmental state, said materials 25A, 25B, 25C having melting points higher than the maximum temperature attained, for example, by the hydraulic fluid during the particular flight.

Figure 5:
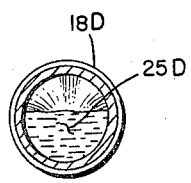
Fig. 5 is a similarly enlarged cross-sectional view, taken at line V—V of Fig. 2, of a chamber whose contents have been melted.
Figure 4:
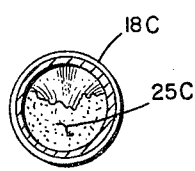
Fig. 4 is an enlarged cross-sectional view, taken at line IV—IV of Fig. 1, of a chamber having an unaffected fusible material therein.

Referring to Fig. 4, a section taken through the chamber 18C (Fig. 1) is shown, said chamber 18C containing a material 25C having a higher melting point than the maximum temperature experienced by the location whose highest temperature was recorded, thus leaving said material 25C in its original unmelted form. Fig. 5 reveals a section taken through the chamber 18D (Fig. 2), to indicate the state of the material 25D therein after being heated to its melting point. Thus, an indelible record is provided by the states of the several materials 25 which unequivocally indicates that the highest temperature experienced was above the melting point of the material 25C, but below the melting point of the material 25D.

It should be understood that the device 9 may conveniently be made of a readily bendable material in order that it may be altered from the axially straight form shown in the drawings to other forms permitting easy placement of the device in various cramped and/or tortuous quarters. Further, the device 9, where rendered advisable by the conditions under which it is used, may be made of stainless steel or still other highly heat-resistant materials.

It therefore is evident that the foregoing discloses an improved temperature-recording device comprising a tubular member of metal or plastic construction capable of being bent to conform to numerous desired shapes and having longitudinally spaced constrictions interlying individually sealed chambers and further having grooved areas for improved accessibility into the chambers. Each chamber contains a material of known melting point which may be appropriately designated by a marking provided exteriorly on the device. Such a device has the advantage of being unbreakable while maintaining a compact and simple form, is easily installed within a location whose maximum temperature is to be recorded, and is virtually infallible in operation.

While only one embodiment of the invention has been shown in the accompanying drawings, it will be evident that various modifications are possible in the arrangement and construction of the maximum temperature recording device components without departing from the scope of the invention.

I claim:

1. For recording the maximum temperature experienced in a chosen place and time-period, an expendible, shock-proof device comprising: an opaque metallic tubular, walled member made of an opaque metallic material substantially immune to inadvertent breakage; a plurality of mutually isolated, closed chambers enclosed by said walled member and formed by pinching said walled member at spaced locations; a respective, fusible material enclosed in each of said chambers and having a known melting point and appearance, the latter being subject to change upon fusion and subsequent cooling of said fusible material, said fusible material in at least one predetermined one of said chambers differing in melting point by a known value from said fusible material in at least one other, known one of said chambers; means for identifying said chambers according to said respective, fusible material contained in each; and means providing ready access to the interior of each of said chambers for inspection of said fusible material therein.

2. A shock-proof, expendible device for recording the maximum temperature occurring in a chosen place and time-period, said device comprising: a tubular, metallic, walled member including a plurality of mutually isolated, closed chambers formed by pinching said walled member at spaced locations; a series of fusible materials, each of said fusible materials being enclosed in a respective one of said chambers and having a known melting point and appearance, the fusible material being subject to change when said material is fused and subsequently cooled, said fusible materials having individually different melting points; markings provided on the exterior of said tubular wall for identifying the respective melting point of said fusible material in each of said chambers; and means providing ready access to the interior of each of said chambers for inspection of said fusible material therein including grooves locally thinning said tubular wall and facilitating breaking into said chambers.

References Cited in the file of this patent

UNITED STATES PATENTS 2,195,395    Chapman _____ Apr. 2, 1940

FOREIGN PATENTS 563,439    Great Britain _____ Aug. 15, 1944